May 12, 1970   H. J. HOEKJE ET AL   3,511,528

EGG PICK-UP FINGERS

Filed Dec. 4, 1967

INVENTORS
HARVERD J. HOEKJE
LEONARD MAX JONES
BY

ATTORNEYS 3,511,528
EGG PICK-UP FINGERS
Harverd J. Hoekje, Hamilton, Mich., and Leonard Max Jones, Ottumwa, Iowa, assignors, by mesne assignments, to U.S. Industries, Inc., New York, N.Y., a corporation of Delaware
Filed Dec. 4, 1967, Ser. No. 687,886
Int. Cl. B66c 1/42
U.S. Cl. 294—99    13 Claims

ABSTRACT OF THE DISCLOSURE

Mechanical fingers for automated egg packers and the like, comprised of an elongated finger element which has a resiliently-deformable leaf spring secured at one end to the tip portion of the finger element and extending toward the base of the same but being shorter in length and also being curved outwardly away from the finger element at the free end of the spring. The fingers are arranged in a symmetrically disposed pattern to form groupings containing at least three fingers, with the leaf spring of each oriented toward the leaf springs of the others. The fingers operate by caging an egg to hold the same, and in so doing the leaf springs are disposed within the egg-receiving cage, where they conform themselves to the particular size and shape of the individual egg with which they are confronted, such that the fingers lightly but firmly hold any given egg, regardless of its relative size.

BACKGROUND

In recent times, automation has made great strides in the care and feeding of poultry and domestic animals, and this is also true in the gathering and processing of eggs. Egg collection and processing has become very much mechanized or automated, and equipment is now available which automatically collects the eggs, cleans them, candles them, grades them, and packs them, all in a continuous sequence and without requiring any significant amount of manual labor.

An example of a very efficient and practical egg packer for such systems is shown in copending application Ser. No. 344,285, filed Feb. 12, 1964, and owned by the assignee of the present invention. In this machine, certain egg pick-up fingers are present and used to transfer eggs from a conveyor means into egg cartons traveling on a different conveyor means, as is fully illustrated and disclosed in the said copending application, to which reference is made for a more complete understanding of that particular device.

In numerous instances, the eggs to be automatically packed are not initially graded into the various established categories, but are instead merely packed without regard to size. In such instances, an egg pick-up finger mechanism is required which will operate equally well on all of the different sizes of eggs, from the smallest "peewee" eggs to the very largest eggs likely to be encountered. As will be appreciated, the handling afforded to the individual eggs in these various sizes must be equally gentle in each case, and this has presented a problem in the past which has resulted in breakage and difficulty, particularly in connection with the smaller eggs.

The present invention provides a mechanical finger construction, and a mechanical hand utilizing a number of such fingers, which readily accommodates eggs of any given size, regardless of the order of appearance thereof, and which affords each size a gentle and secure handling that minimizes breakage and accomplishes the desired objective in a most effective manner, and by an uncomplicated and reliable structural arrangement.

SUMMARY OF THE INVENTION

The mechanical finger construction of the invention comprises an elongated finger element and a resiliently deformable member attached to the finger element which has a portion extending somewhat away from the latter, in a direction toward an egg which is to be handled. The aforesaid member attached to the finger element is resiliently deformed by contact of its said extending portion with the egg being handled, and this cushions such contact to afford the egg gentle treatment. Also, this deformation in effect conforms the finger element to the particular size and shape of the egg actually being handled, regardless of size variations in the eggs. The mechanical fingers are arranged in equally-spaced symmetry to form a caging receptacle for the eggs, and the aforesaid deformable member associated with each finger element is located within the caging receptacle, where the resilient deformation of each such member tends to center the egg being handled.

DRAWINGS

PREFERRED EMBODIMENT

Figure 1:
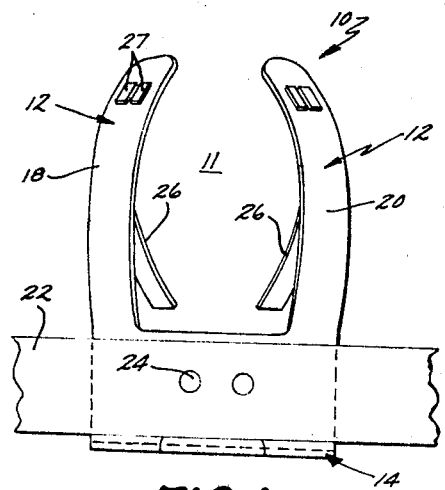
FIG. 1 is a fragmentary side elevation of a mechanical hand construction made up of mechanical fingers according to the invention.
Figure 2:
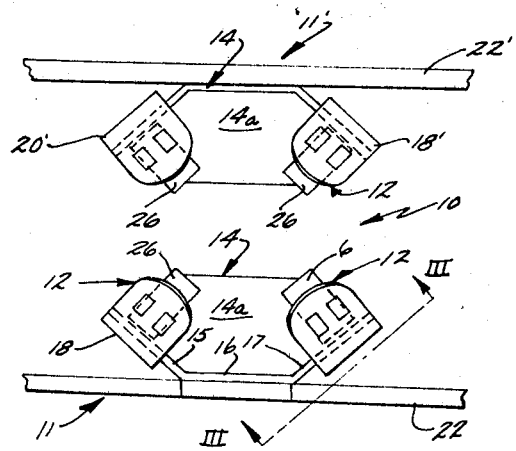
FIG. 2 is an overhead plan view of the structure of FIG. 1.

In FIGS. 1 and 2, a mechanical hand 10 is shown which is made up of four of the mechanical finger constructions 12 to which the invention pertains. It will be observed that the hand 10 is actually comprised of two separate finger assemblies 11 and 11', each including a pair of the fingers 12, which preferably are interconnected by a common and integral base portion 14. The latter comprises a flat bottom extremity 14a (FIG. 2) having upstanding side portions 15, 16 and 17, which are disposed in planes which are respectively oriented at an angle of one hundred thirty-five degrees to each other (i.e., the plane of portion 15 is oriented perpendicular to that of plane 17), to in effect form one-half of a hexagonal cup-like component. The two sides 15 and 17 each support an upstanding finger element 18 and 20, respectively, which are preferably integral with their respective side portions. As illustrated in FIG. 2, the two oppositely-disposed finger assemblies 11 and 11' thus give the mechanical hand 10 two pairs of finger constructions 12 which are positioned opposite from each other, each such finger construction being spaced from and symmetrically oriented with respect to the others.

The finger constructions 12 and their upright finger elements 18, 18' and 20, 20' thus form what may be considered as a caging receptacle for eggs, one of the pointed ends of which will be located adjacent the bottom 14a of the hand, i.e., the longitudinal axis of the eggs will be oriented generally parallel to the longitudinal axis of the various finger elements. In order to cushion such pointed end, a pad or cushion of softly resilient material such as foam rubber or polyurethane, not specifically shown) may be mounted atop each of the base portions 14a, so as to lie between this portion and the egg itself, inasmuch as the finger constructions 12 and their base portions are of hard and relatively unyieldable plastic or metal.

The end extremities of each of the finger elements 18, 20 are curved inwardly at least slightly to in effect partially close the otherwise open upper or outermost end extremity of the egg-caging receptacle formed by the mechanical hand, such that eggs carried between the fingers of the hand will be safely held, even though the hand may be turned upside down during some of its movements in carrying the eggs. Each of the two integrally connected finger constructions comprising the finger assemblies 11, 11' are mounted for operation, as by rivets 24, on oppositely-disposed side rail members 22 and 22', respectively, which lie adjacent the side portions 16 of the respective bases of these finger assemblies. Since each such rail member thus supports an entire finger assembly, it will be understood that pivotal or rocking movement of either rail about its longitudinal axis will open the mechanical hand 10 by moving the end extremities of the two integrally connected fingers (i.e., fingers 18, 20 and/or 18', 20') away from the end extremities of the other two fingers, at which time an egg may be slid endwise into the opened receptacle which the hand defines. A somewhat more detailed description of a mechanical hand per se formed by similar finger elements, and the operation of such within an egg-packer assembly, is given in the aforementioned copending application Ser. No. 344,285, to which reference is made.

Figure 4:
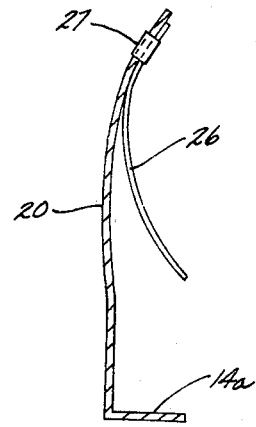
FIG. 4 is a sectional elevation taken through the plane IV—IV of FIG. 3.

In the present invention, each of the finger elements 18, 18' and 20, 20' is provided with a leaf spring 26 comprising a resiliently deformable member for actually making contact with eggs which the hand 10 is to hold or pick up. It will be observed (FIG. 4) that each of the leaf springs 26 is cantilevered from one of its ends to its respective finger elements, near the tip end of the latter, and that each of the leaf springs (which are identical) is curved along a major portion of its length (FIGS. 1 and 6), to extend inwardly of the hand and away from the finger element. The leaf springs 26 are basically flat elongated members, and the inwardly-curving shape just mentioned allows these springs to contact and resiliently cradle eggs placed within the mechanical hand. Thus, the spring members will in effect reach out from their respective finger elements to support and cradle smaller eggs at their bottom extremities, the periphery of which the spring will resiliently conform itself to. With increasingly larger eggs, the springs 26 will be increasingly deformed outwardly toward their respective finger elements, to thereby center and support in a cradling manner all such eggs, directly in relation to their particular individual sizes.

Figure 5:
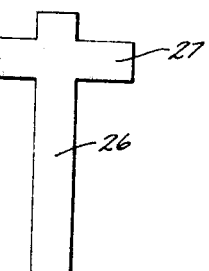
FIG. 5 is a layout-type plan view of the deformable member attached to the finger element, showing the shape in which the member is initially formed.
Figure 3:
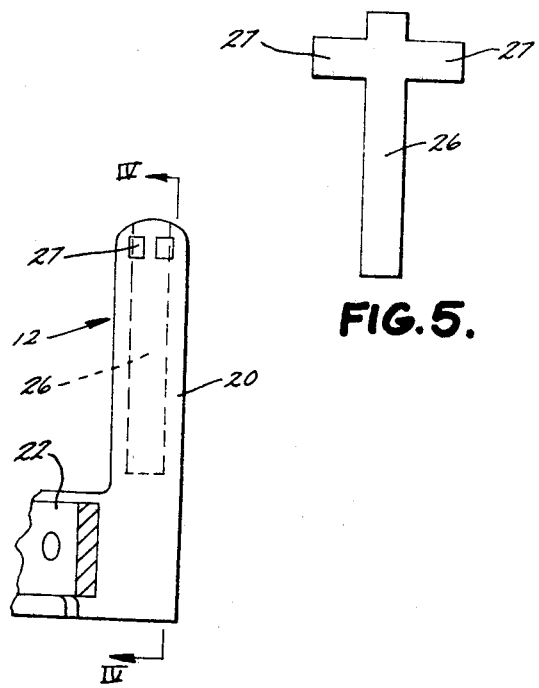
FIG. 3 is a fragmentary sectional elevation taken through the plane III—III of FIG. 2, showing a single finger construction.

The leaf spring 26 are preferably made of stainless steel, of a thickness in the neighborhood of ten thousandths of an inch. The springs are preferably initially formed from flat sheet stock, having the cross-like configuration illustrated in FIG. 5. The cross bars 27 illustrated there are for securing the spring to its respective finger element, in the following manner. When the spring member is initially formed it is flat, with its cross bars 27 extending laterally outward. These are then bent normal to the remainder of the spring element, and parallel to each other. The remainder of the spring element is then formed by bending into the curvature illustrated in FIG. 4, and the spring member is mounted to its finger element by passing the cross bars 27 through appropriate slot-like apertures formed in the tips or end extremities of the finger elements. The cross bars are then bent over against the back of the finger elements, as illustrated in FIGS. 1, 2, and 3, to retain the spring members upon the finger elements without the requirement of additional fasteners, and with the spring members thus having a flat internal periphery.

The mechanical fingers provided by the present invention provide a very useful and advantageous construction by which an egg grader or like egg-handling machine may very readily handle ungraded eggs appearing in random size variations, with each different egg being handled with equal facility. As stated, the spring members will resiliently cradle small eggs, holding their lower end portions well above the bottom 14a of the hand, with the pointed ends of the eggs being firmly supported between the end extremities of the spring members and the tips of the finger elements, with such small eggs firmly centered within the hand even though the hand itself is wider across its lower extremity than the eggs. When larger eggs are placed in the hand, the springs resiliently flex outwardly toward their respective finger elements to accommodate such eggs in a manner determined by the specific sizes thereof, with all eggs receiving equally gentle treatment.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:

1. A mechanical hand construction for picking up and/or holding eggs and the like, comprising: a plurality of elongated, generally parallel finger elemnts; mounting and articulating means for holding said finger elements in mutually spaced relation defining an egg-caging receptacle and for moving at least one such finger to open and close said receptacle, and a resilient spring member attached to at least some of said finger elements; each such spring member having an egg-engaging portion located inside said receptacle, for contacting an egg therewithin and resiliently cradling such egg to urge the same toward a predetermined position within said receptacle.

2. The mechanical hand construction of claim 1, wherein said egg-engaging portion of said spring member is generally flat.

3. The mechanical hand construction of claim 1, wherein some of said finger elements are disposed opposite each other across said receptacle and each such element has one of said resilient spring members, such that the latter tend to center an egg therebetween.

4. The mechanical hand construction of claim 1, wherein said finger elements number at least three and are arranged substantially equally spaced in a symmetrical pattern, each such finger element having one of said resilient spring members, such that the latter tend to center an egg placed within said receptacle between the symmetrically arranged finger elements.

5. The mechanical hand construction of claim 4, wherein said egg-engaging portion of said spring members is generally flat.

6. The mechanical hand construction of claim 5, wherein said spring members each comprise leaf springs.

7. A mechanical hand construction for picking up and/or holding eggs and the like, comprising: at least three elongated finger elements arranged substantially equally spaced in a symmetrical pattern defining an egg-caging receptacle; mounting and articulating means for holding said finger elements in said mutually spaced relation and for moving at least one such finger to open and close said receptacle; a resilient generally flat leaf spring member attached to each of said finger elements; each such spring member having an egg-engaging portion located inside said receptacle, for contacting an egg therewithin and resiliently cradling such egg to tend to center the same within said receptacle; said symmetrical finger elements having end extremities which are curved to extend toward one another and which thereby at least partially close an end extremity of said receptacle; and said leaf springs being secured to said finger elements by an end portion of the spring which is located near the said end extremity of the corresponding finger element, said springs each having a free end located opposite the aforesaid attached end thereof and spaced from said receptacle end extremity by the length of the springs.

8. The mechanical hand construction of claim 7, wherein portions of said springs are curved, such that the said free ends of the springs extend inwardly toward the center of said receptacle.

9. A mechanical finger construction for use in automated egg packers and the like, comprising: an elongated finger element; and a resiliently deformable member cantilevered from said finger element and having a portion extending at least slightly away from the latter, in a direction toward an egg to be handled by the finger construction; said member being resiliently deformable by contact of said extending portion with such an egg to cushion such contact; and such deformation in effect conforming said finger by its said member to eggs regardless of size variations between different eggs, to better handle differing sizes thereof.

10. The finger construction of claim 9, wherein said extending portion whch contacts such egg is generally flat.

11. The finger construction of claim 10, wherein said resiliently deformable member comprises a leaf-type spring.

12. The finger construction of claim 11, wherein said leaf spring is curved along at least a part of its length and has a free end extremity comprising said extending portion.

13. The finger construction of claim 12, wherein said finger element has a tip end, and wherein said leaf spring is secured to said finger element near the said tip end thereof; said free end of said spring being spaced from said finger element tip end by at least the length of said spring.

References Cited

UNITED STATES PATENTS

| | | |
|---|---|---|
| 851,987 | 4/1907 | Hewitt. |
| 1,081,701 | 12/1913 | Sandman _____ 294—99 |
| 1,184,372 | 5/1916 | Nalley. |
| 2,792,253 | 5/1957 | Bliss. |

HARVEY C. HORNSBY, Primary Examiner

U.S. Cl. X.R.

294—87